United States Patent
Sakaguchi et al.

(10) Patent No.: US 10,091,156 B2
(45) Date of Patent: Oct. 2, 2018

(54) TRANSMISSION DEVICE THAT DETERMINES A RECEIVED MAIL IS A REPLY TO A PREVIOUSLY SENT MAIL AND GENERATES A MAIL HAVING A BCC RECIPIENT

(71) Applicant: KYOCERA Document Solutions Inc., Osaka (JP)

(72) Inventors: Shoichi Sakaguchi, Osaka (JP); Hideki Takeda, Osaka (JP); Yoshihisa Tanaka, Osaka (JP); Yumi Hirobe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 122 days.

(21) Appl. No.: 15/117,610

(22) PCT Filed: Jun. 17, 2015

(86) PCT No.: PCT/JP2015/067382
§ 371 (c)(1),
(2) Date: Aug. 9, 2016

(87) PCT Pub. No.: WO2015/198924
PCT Pub. Date: Dec. 30, 2015

(65) Prior Publication Data
US 2016/0359787 A1 Dec. 8, 2016

(30) Foreign Application Priority Data
Jun. 24, 2014 (JP) .................. 2014-129410

(51) Int. Cl.
*G06F 15/16* (2006.01)
*H04L 12/58* (2006.01)
(52) U.S. Cl.
CPC .............. *H04L 51/28* (2013.01); *H04L 51/14* (2013.01); *H04L 51/22* (2013.01)

(58) Field of Classification Search
USPC .......................................... 709/206
See application file for complete search history.

(56) References Cited

U.S. PATENT DOCUMENTS 6,920,564 B2 * 7/2005 Decuir ................ H04L 63/0428
713/165
7,093,136 B2 * 8/2006 Decuir ................ H04L 63/0428
713/165
(Continued)

FOREIGN PATENT DOCUMENTS

JP 2001-325187 A 11/2001
JP 2002-009845 A 1/2002
(Continued)

*Primary Examiner* — Alicia Baturay
(74) *Attorney, Agent, or Firm* — Hawaii Patent Services; Nathaniel K. Fedde; Kenton N. Fedde

(57) ABSTRACT

A communication device is provided which includes a transmission unit, a BCC memory unit, a reception unit, a determination module, an accepting module and a mail generation module. The BCC memory unit stores the BCC destination of the mail sent in the past while being associated with the mail. The determination module determines whether or not a mail that the reception unit receives is a reply mail to the mail including the BCC destination that the transmission unit sent in the past. The mail generation module generates a mail addressed to sending destinations to which the BCC destination stored in the BCC destination memory unit while being associated with a mail of a reply source is added in addition to a sending destination that the accepting module accepts for the mail determined to be a reply mail to the mail including the BCC destination and sent in the past.

5 Claims, 10 Drawing Sheets

(56) References Cited

U.S. PATENT DOCUMENTS

| | | | |
|---|---|---|---|
| 8,756,284 B2* | 6/2014 | Murphy | G06Q 10/107 709/204 |
| 8,756,285 B2* | 6/2014 | Kosuda | H04L 51/14 358/402 |
| 8,762,385 B2* | 6/2014 | Gill | G06Q 10/107 707/741 |
| 2001/0030960 A1 | 10/2001 | Nakada et al. | |
| 2003/0023696 A1 | 1/2003 | Aikawa et al. | |
| 2005/0091318 A1* | 4/2005 | Keohane | G06Q 10/107 709/206 |
| 2005/0198143 A1 | 9/2005 | Moody et al. | |
| 2008/0168360 A1 | 7/2008 | Wilson | |
| 2012/0158860 A1* | 6/2012 | Chakra | H04L 51/28 709/206 |
| 2014/0379813 A1* | 12/2014 | Charania | H04L 51/02 709/206 |
| 2015/0339285 A1* | 11/2015 | Safaei | G06F 17/248 715/256 |
| 2016/0099904 A1* | 4/2016 | Agathangelos | G06Q 10/107 709/206 |
| 2016/0359784 A1* | 12/2016 | Sakaguchi | G06F 3/14 |

FOREIGN PATENT DOCUMENTS

| | | |
|---|---|---|
| JP | 2003-030106 A | 1/2003 |
| JP | 2008-085955 A | 4/2008 |

\* cited by examiner

FIG.5

| Message-id information | BCC destinations |
|---|---|
| 20140512160922398203438103 | ddd@ddd.com, eee@eee.com, fff@fff.com, ggg@ggg.com, hhh@hhh.com |
| 20131114130215387986685768 | xxx@xxx.com, yyy@yyy.com |
| 20122109111587907086996873 | ddd@ddd.com, ggg@ggg.com, yyy@yyy.com |
| ... | ... |

14 memory unit

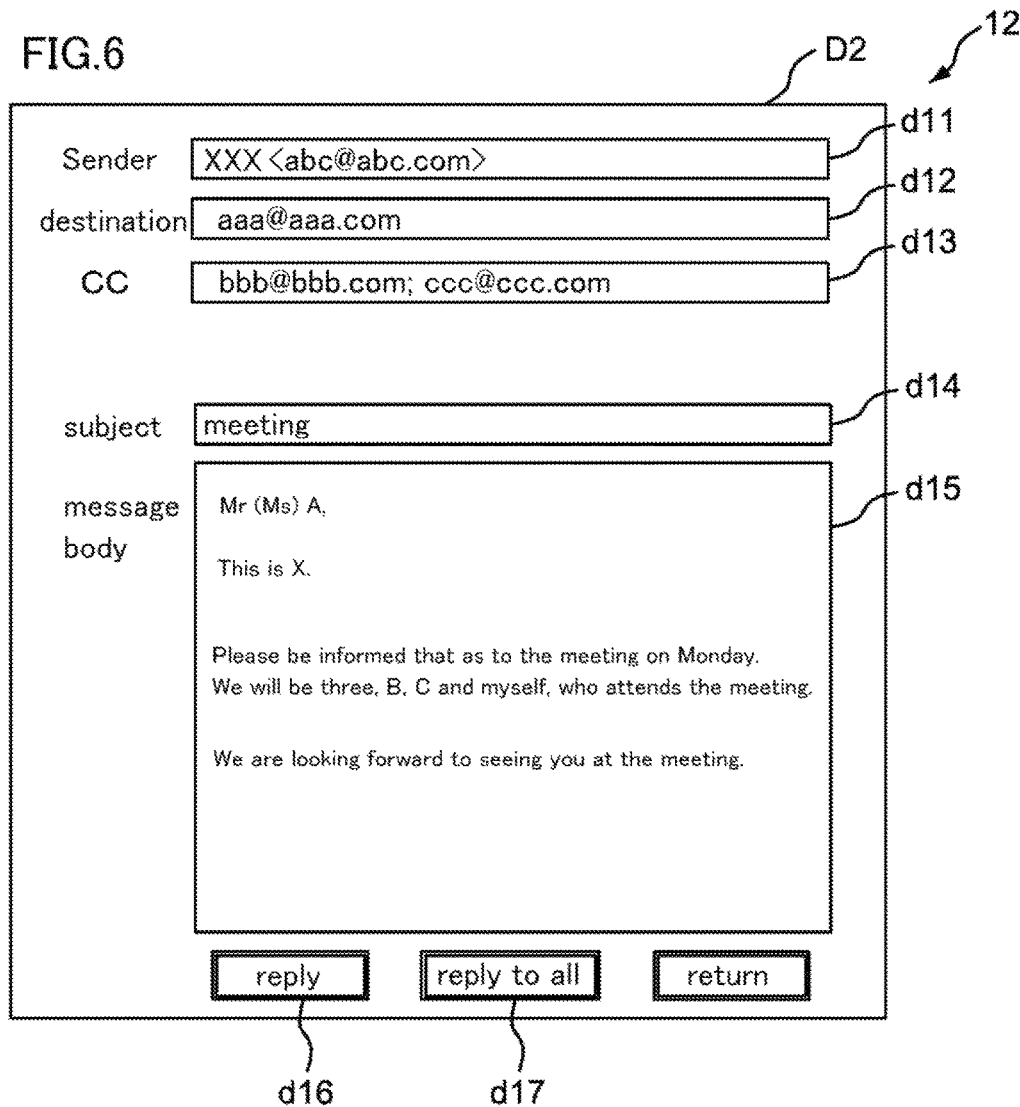

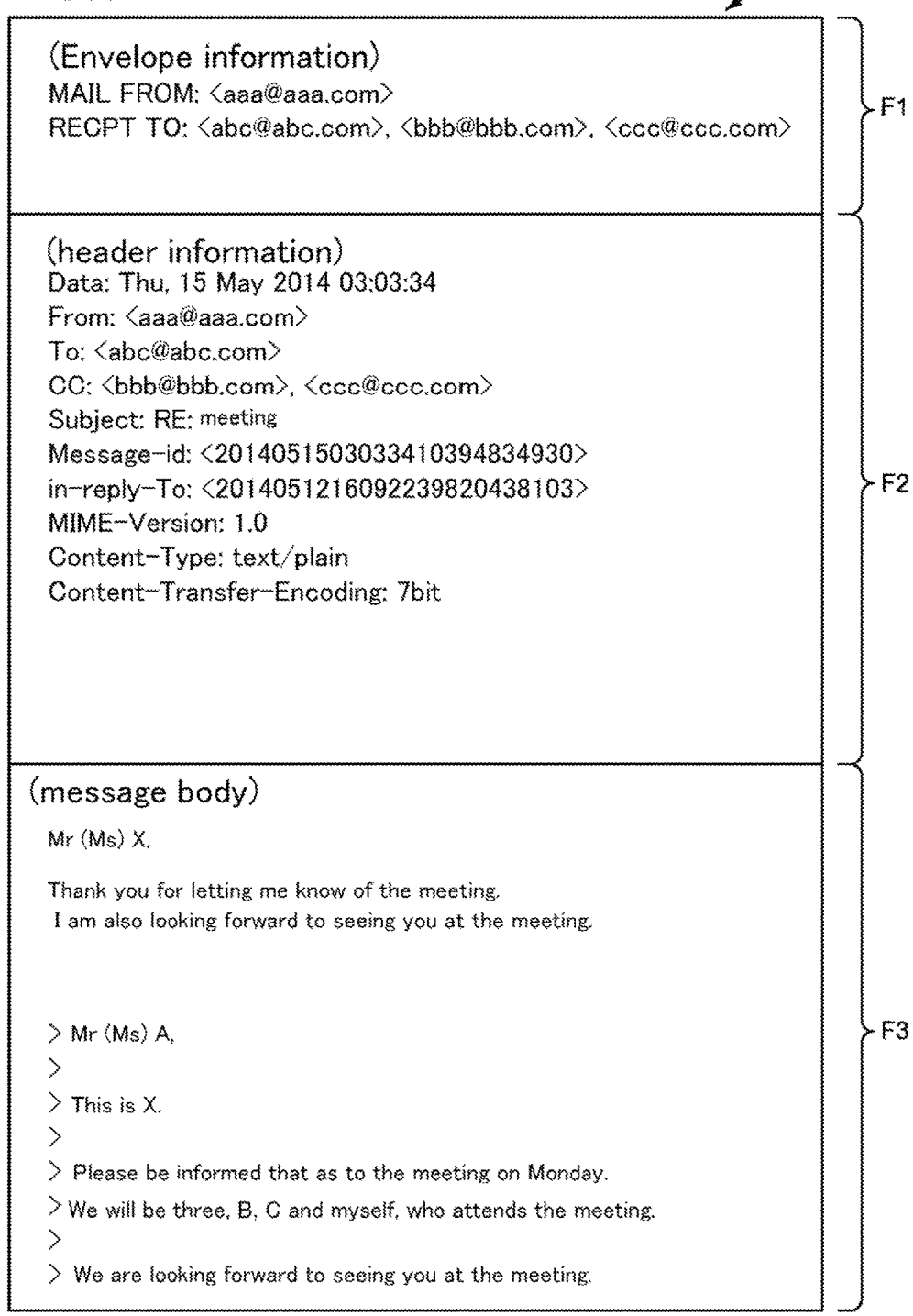

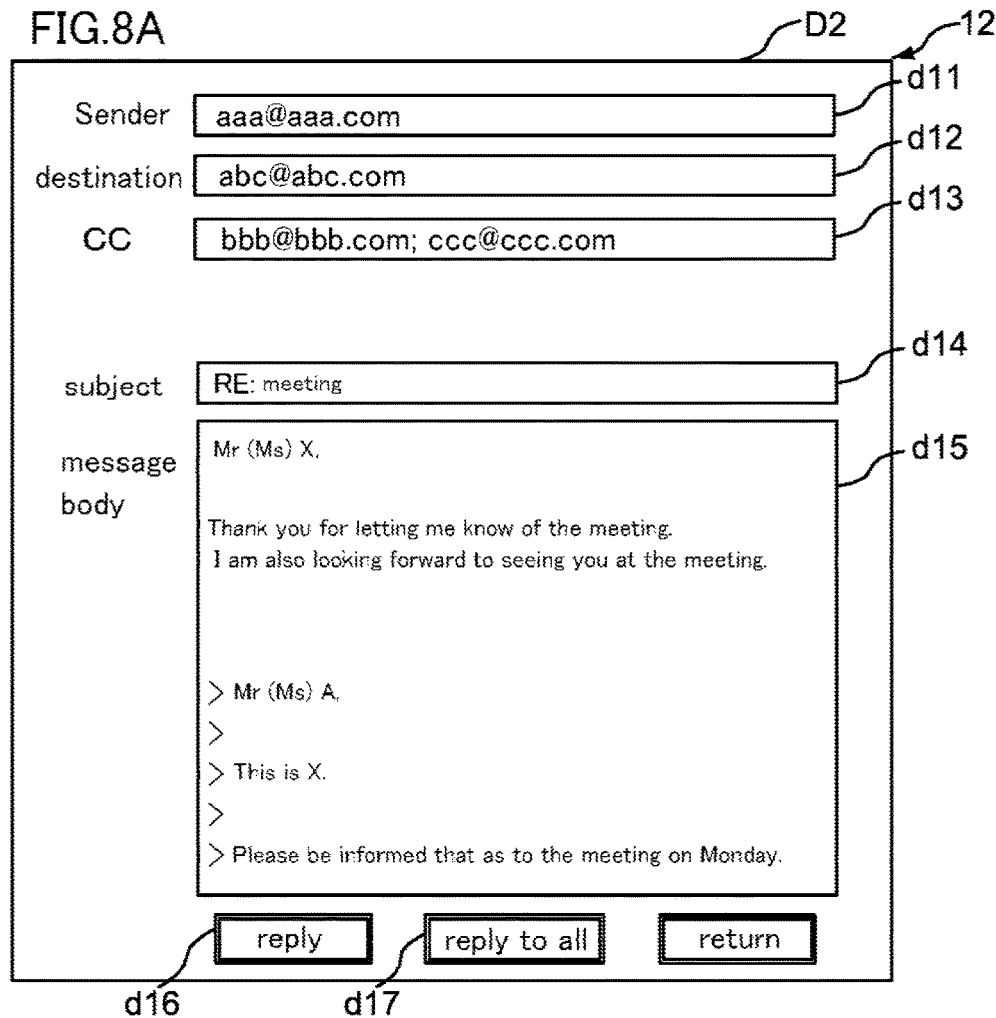

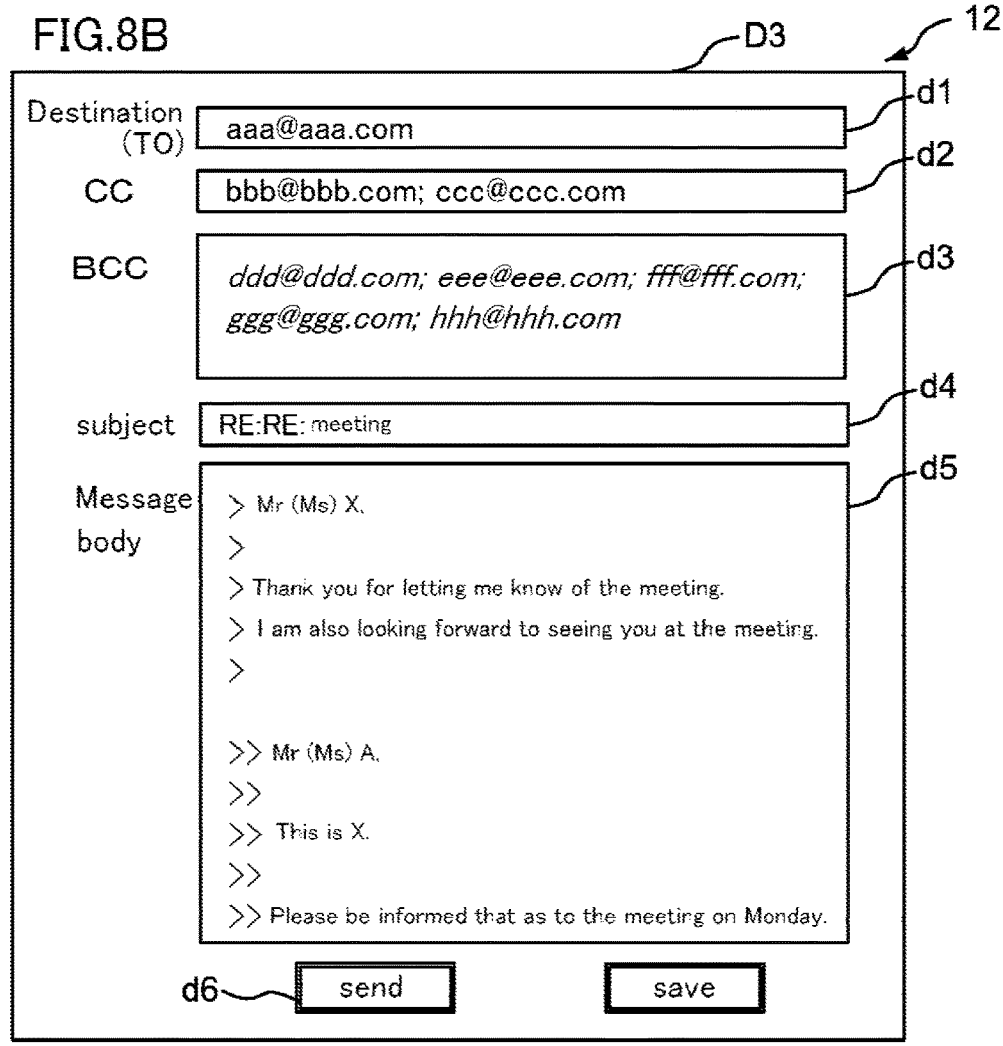

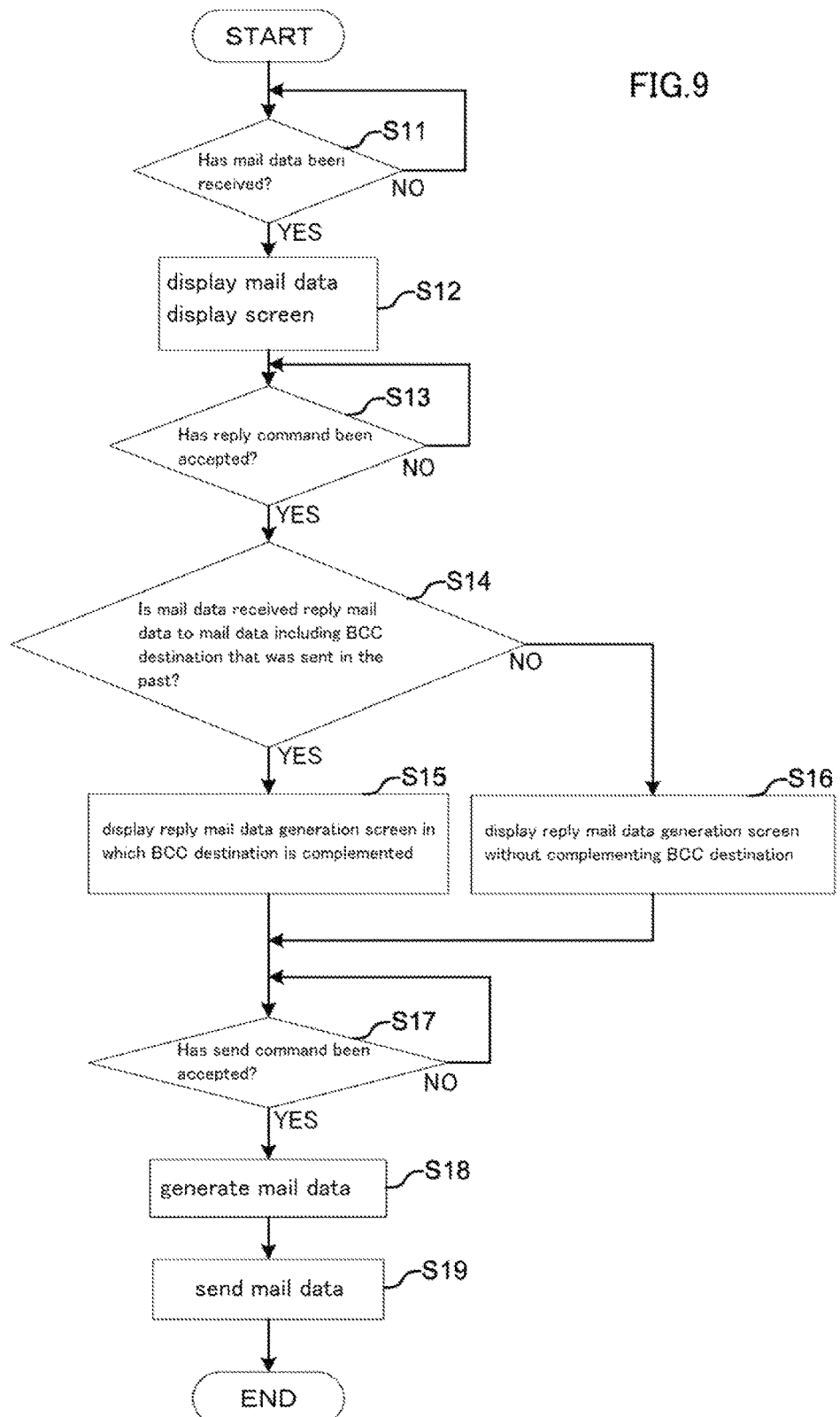

TRANSMISSION DEVICE THAT
DETERMINES A RECEIVED MAIL IS A
REPLY TO A PREVIOUSLY SENT MAIL AND
GENERATES A MAIL HAVING A BCC
RECIPIENT

TECHNICAL FIELD

The present invention relates to a communication device that sends mail data to a mail server, and more particularly to a technique of sending mail data that is addressed to sending destinations including BCC (Blind Carbon Copy) destinations.

BACKGROUND ART

In general, a "reply to all button" is provided in addition to a "reply button" on a mail data display screen that displays mail data received. When the user selects the "reply to all button," the mail data display screen is shifted to a reply mail data generation screen in which a TO destination included in the mail data received is inputted in advance in a TO destination input field and a CC destination is inputted in advance in a CC destination input field. Since the TO destination and the CC destination are inputted in advance on the reply mail data generation screen, the labor hours required by the user to input mail addresses can be reduced.

PRIOR ART LITERATURE

Patent Literature

Patent Literature 1: JP-A-2001-325187

SUMMARY OF THE INVENTION

Problem that the Invention is to Solve

In the case of the mail data received being the reply mail data to the mail data sent in the past, there is a situation in which reply mail data to the mail data received is wanted to be sent to the BCC destination of the mail data sent in the past. Even when the "reply button" or the "reply to all button" is selected, the BCC destination is not inputted complementarily in advance unlike in the case of the TO destination or the CC destination, and therefore, it is troublesome that the user is required to input the BCC destination.

The invention has been made in view of these situations, and an object thereof is to save the labor of a user in inputting the BCC destination to which the mail data was sent in the past when the user replies to the reply mail data to the mail data sent in the past.

Means for Solving the Problem

According to an aspect of the invention, there is provided a communication device including a transmission unit that sends a mail, a BCC destination memory unit that stores a BCC destination of a mail sent by the transmission unit in the past in association with the mail, a reception unit that receives a mail, a determination module that determines whether or not the mail received by the reception unit is a reply mail to the mail including the BCC destination that was sent by the transmission unit in the past, an accepting module that accepts commands in relation to transmission or reception of a mail, and a mail data generation module that generates, when the accepting module accepts a reply command to reply to, in mails that the reception unit has received, a mail that is determined to be a reply mail to a mail including a BCC destination that the transmission unit sent in the past by the determination module, a mail that is addressed to sending destinations to which a BCC destination stored in the BCC destination memory unit so as to be associated with a mail of a reply source of the reply mail is added in addition to a sending destination that the accepting module accepts.

Advantage of the Invention

According to the invention, when replying to the reply mail data to the mail data sent in the past, it is possible to save the labor of a user in inputting the BCC destination to which the mail data was sent in the past.

BRIEF DESCRIPTION OF DRAWINGS

FIG. 5 is a diagram showing an example of BCC destinations that are stored in a memory module of the mail client according to the embodiment of the invention.

FIG. 6 is a diagram showing an example of a mail data display screen that is displayed on the display unit of the mail client according to the embodiment of the invention.

FIG. 7 is a diagram showing an example of mail data that is generated by the mail data generation module of the mail client according to the embodiment of the invention.

FIG. 8A is a diagram showing an example of a mail data display screen that is displayed in the display unit of the mail client according to the embodiment of the invention.

FIG. 8B is a diagram showing an example of a reply mail data generation screen that is displayed on the display unit of the mail client according to the embodiment of the invention.

FIG. 9 is a flowchart showing a flow of mail data reply operations of the mail client according to the embodiment of the invention.

MODE FOR CARRYING OUT THE INVENTION

Figure 1:
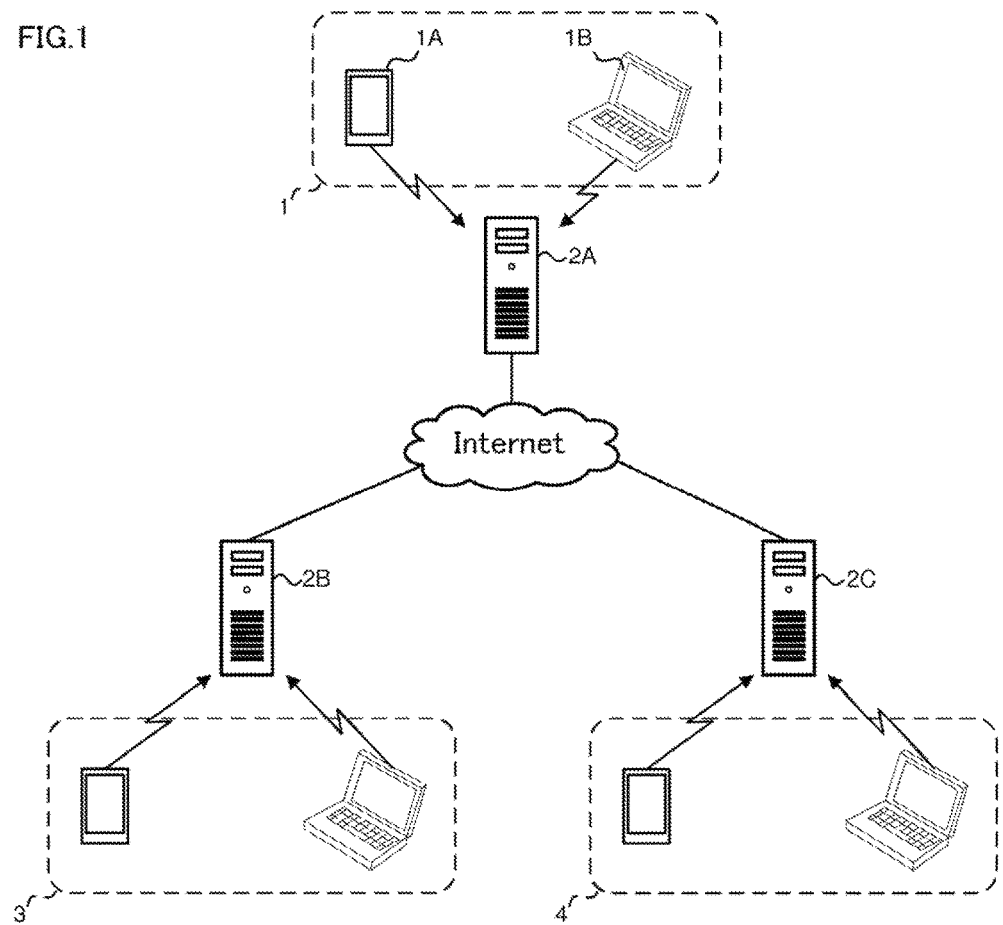
FIG. 1 is a conceptual diagram of a mail transmission and reception system according to an embodiment of the invention.

Hereinafter, referring to the drawings, a communication device and a communication control program according to an embodiment of the invention will be described. FIG. 1 is a conceptual diagram of a mail transmission and reception system according to an embodiment of the invention. The mail transmission and reception system is made up of mail clients (communication devices) and mail servers that are connected to each other via the Internet.

A mail client 1A and a mail client 1B (hereinafter, referred to as a "mail client 1" as a whole from time to time) are a mobile communication terminal such as a smart phone or a PC (Personal Computer). The mail client 1 connects to the Internet via a communication network of a mobile phone company or a public LAN (Local Area Network) to thereby be able to communicate with a mail server 2A to send or receive data. The mail client 1 generates mail data that corresponds to a user operation by a mail generator and sends the mail data generated to the mail server 2A by the use of a SMTP (Simple Mail Transfer Protocol).

The mail server 2A delivers mail data to a mail server 2B or a mail server 2C based on the mail data sent thereto from the mail client 1.

A mail client 3 or a mail client 4 communicates with the mail server 2B or the mail server 2C and downloads the mail data when the mail data is delivered to the mail server 2B or the mail server 2C.

Figure 2:
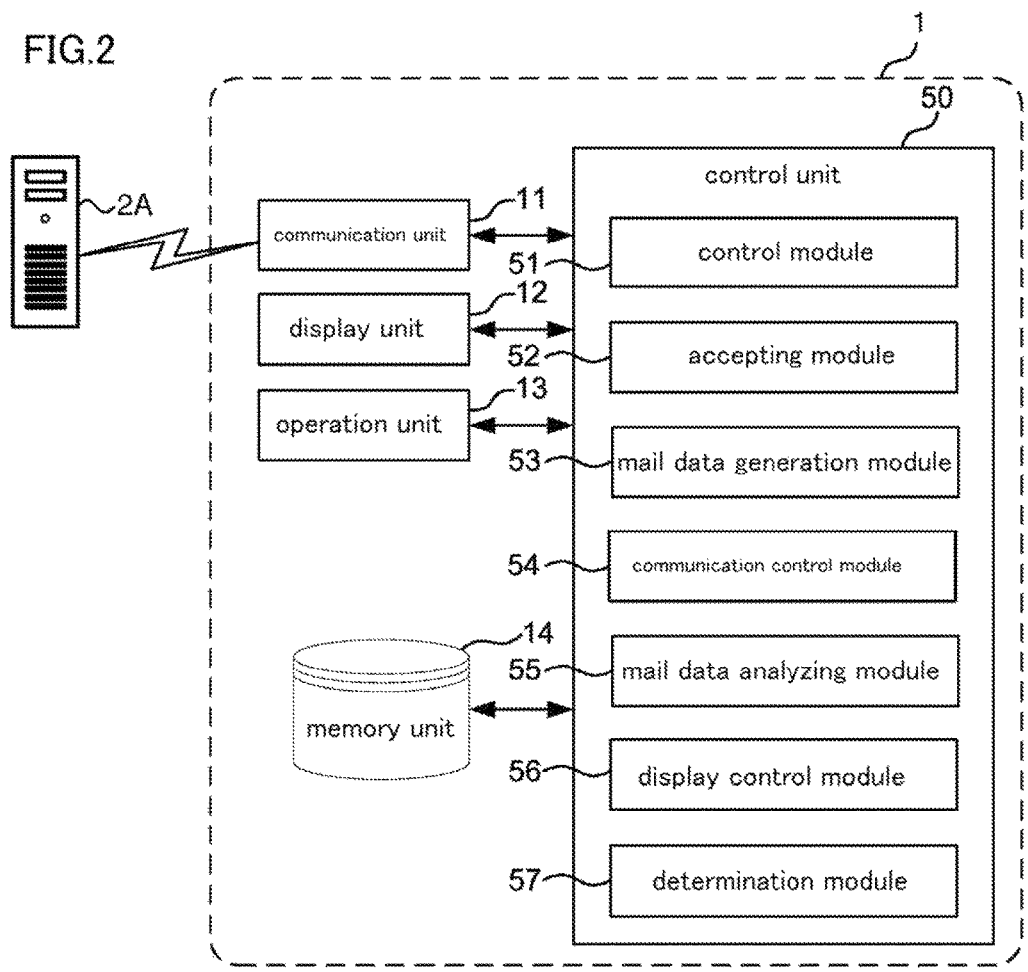
FIG. 2 is a block diagram showing the configuration of a mail client according to the embodiment of the invention.

FIG. 2 is a block diagram showing the configuration of the mail client 1. The mail client 1 includes a communication unit 11, a display unit 12, an operation unit 13 and a memory unit 14.

The communication unit 11 includes a communication module such as a LAN chip and sends mail data to or receives mail data from the mail server 2A under control of a communication control module 54, which will be described later.

The display unit 12 includes a liquid crystal display (LCD: Liquid Crystal Display)) or an organic EL (OLED: Organic Light-Emitting Diode) display. The display unit 12 displays a mail data generation screen, a mail data display screen and the like under control of a display control module 56, which will be described later.

The operation unit 13 includes an input device such as a keyboard and a pointing device such as a mouse. The operation unit 13 accepts a user operation regarding a screen that is displayed on the display unit 12 from the mail generator.

The memory unit 14 is a storage device with a large storage capacity such as an HDD (Hard Disk Drive). The memory unit 14 functions as a BCC destination memory unit that stores the BCC destinations of the mail data sent in the past by the communication unit 11 by associating the BCC destinations with the mail data.

The mail client 1 includes further a control unit 50. The control unit 50 is made up of a CPU (Central Processing Unit), a RAM (Random Access Memory), a ROM (Read Only Memory) and the like. The control unit 50 functions as a control module 51, an accepting module 52, a mail data generation module 53, the communication control module 54, a mail data analyzing module 55, the display control module 56 and a determination module 57 as a result of a communication control program stored in the ROM or the memory unit 14 being executed by the CPU. The control module 51, the accepting module 52, the mail data generation module 53, the communication control module 54, the mail data analyzing module 55, the display control module 56 and the determination module 57 of the control unit 50 do not have to operate based on the communication control program described above but may be made individually up of hardware circuitries.

The control module 51 governs the control of an overall operation of the mail client 1. The control module 51 connects to the communication unit 11, the display unit 12, the operation unit 13 and the memory unit 14 so as not only to control the operations of those connected constituent units of the mail client 1 but also to send or receive signals or data to or from the constituent units.

The accepting module 52 has a function to accept commands such as a command to reply to mail data received by the communication unit 11, a command to input a mail message body, a command to input a mail address as a sending destination, and a command to select a type of a sending destination, based on user operations performed through the operation unit 13 by a mail generator.

The mail data generation module 53 has a function to generate mail data based on the command that the accepting module 52 has accepted. The detailed contents of the mail data that the mail data generation module 53 generates will be described later.

The communication control module 54 has a function to control the transmission and reception of data by the communication unit 11 and functions as a transmission unit for transmitting mail data and a reception unit for receiving mail data together with the communication unit 11. Specifically speaking, the communication control module 54 instructs the communication unit 11 to send the mail data generated by the mail data generation module 53 to the mail server 2A. The communication control module 54 communicates with the mail server 2A via the communication unit 11 at a timing at which the accepting module 52 accepts a mail reception confirmation command that the accepting module 52 or a timing at which a specified amount of time elapses to confirm whether or not mail data has been delivered to the mail server 2A. In the case of the mail data having been delivered to the main server 2A, the communication control module 54 instructs the communication unit 11 to download (receive) the mail data from the mail server 2A.

The mail data analyzing module 55 has a function to analyze header information or the like that is included in the mail data that the communication control module 54 has received via the communication unit 11.

The display control module 56 has a function to control a display operation by the display unit 12.

The determination module 57 determines whether or not mail data received by the communication unit 11 is reply mail data to the mail data including BCC destinations that was sent by the communication unit 11 in the past.

Figure 3:
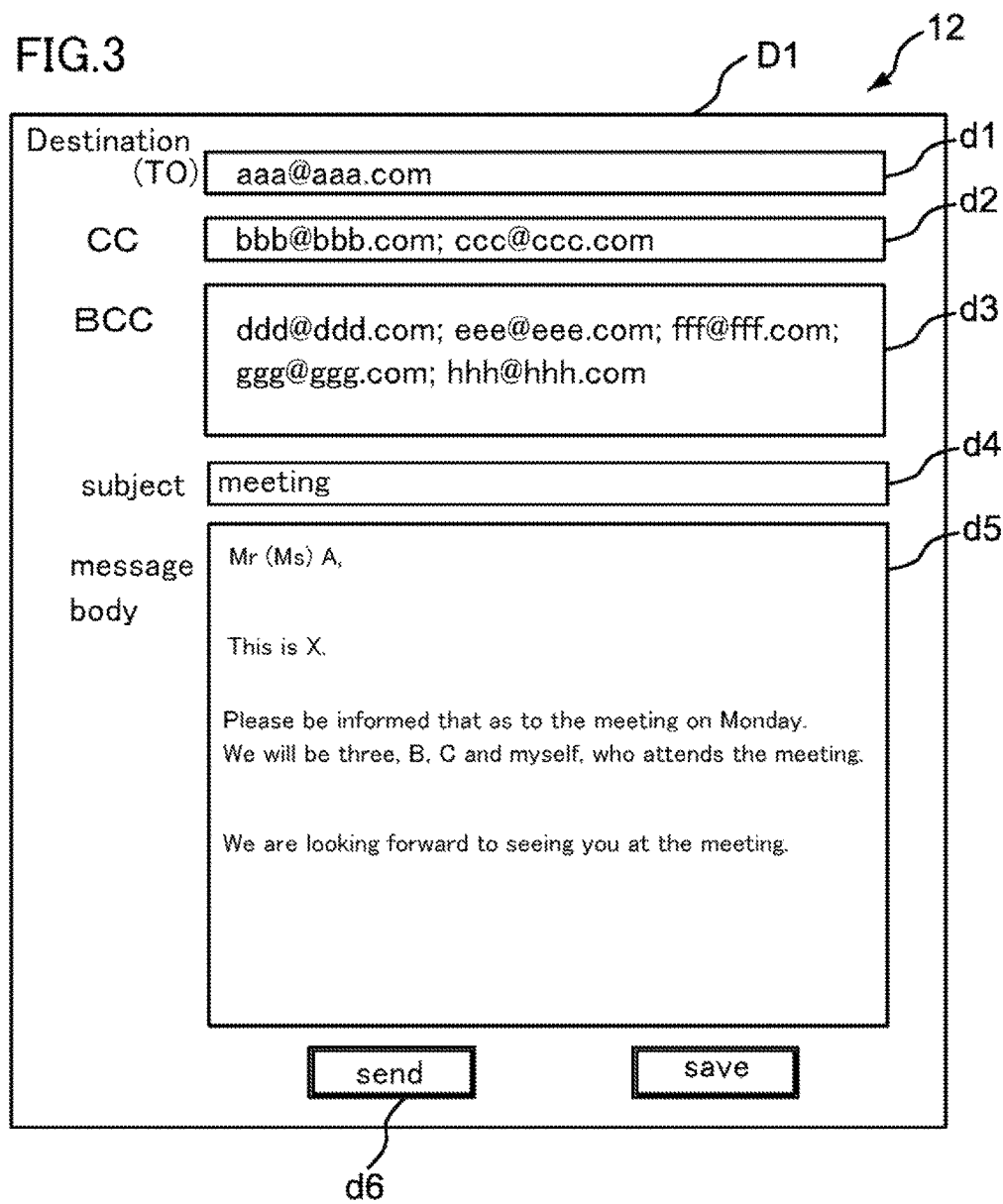
FIG. 3 is a diagram showing an example of a mail data generation screen that is displayed on a display unit of the mail client according to the embodiment of the invention.

Following this, specific details of a process of sending mail data for reply is described. FIG. 3 is an example of a mail data generation screen D1 that is displayed on the display unit 12. A TO destination input field d1 that accepts a TO destination input command, a CC destination input field d2 that accepts a CC destination input command, a BCC destination input field d3 that accepts a BCC destination input command, a subject input field d4 that accepts a subject input command, and a mail message body input field d5 that accepts a mail message body input command are provided on the mail data generation screen D1. In addition, a send button d6 is provided on the mail data generation screen D1. When the accepting module 52 accepts the selection of the send button d6, the mail data generation module 53 generates mail data corresponding to information inputted in the input fields described above. Thereafter, the communication control module 54 instructs the communication unit 11 to send the mail data generated by the mail data generation module 53 to the mail server 2A.

Figure 4:
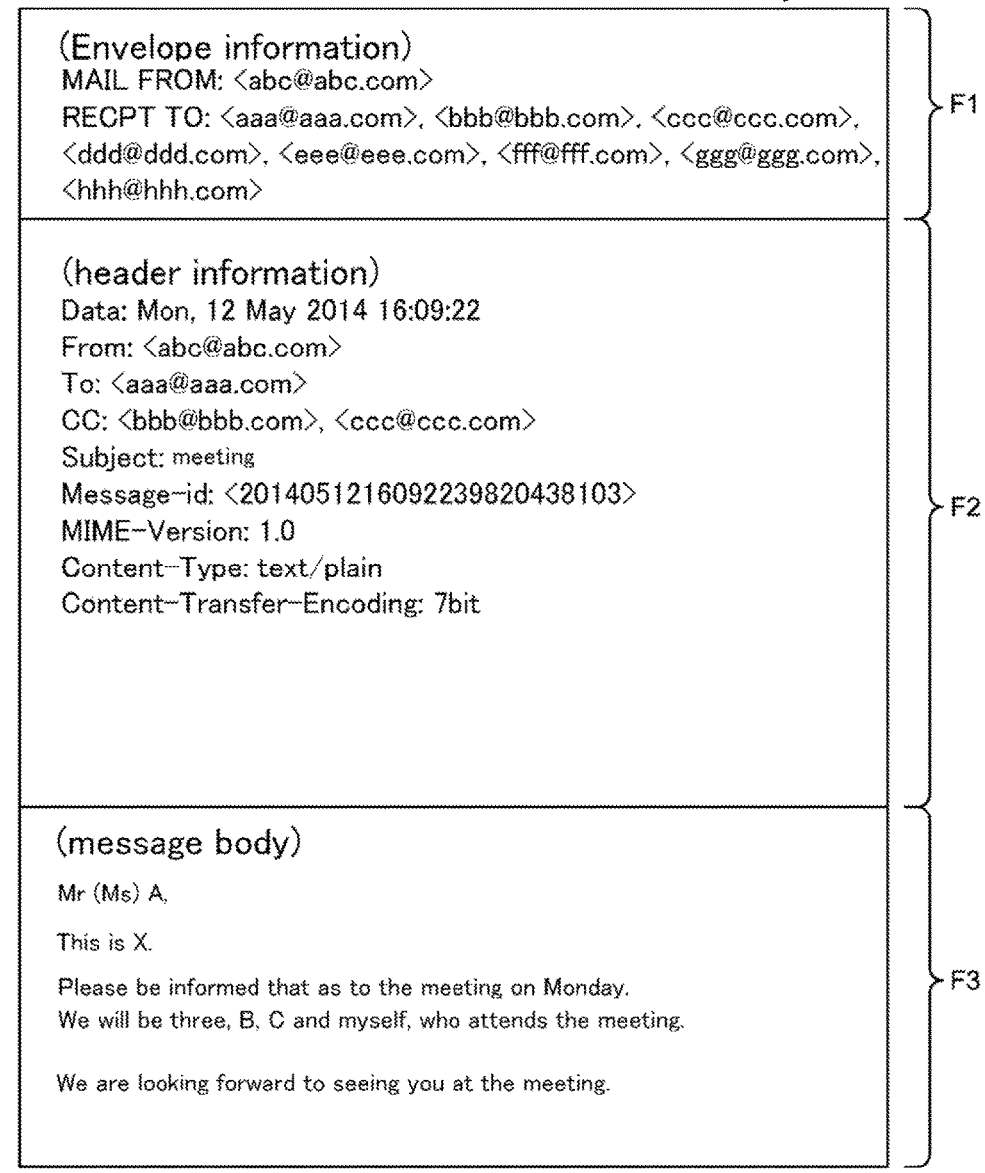
FIG. 4 is a diagram showing an example of mail data that is generated by a mail data generation module of the mail client according to the embodiment of the invention.

FIG. 4 is a diagram showing an example of mail data M1 that is generated by the mail data generation module 53.

The mail data M1 includes envelope information F1, header information F2 and mail message body information F3. The envelope information F1 includes MAIL FROM information that indicates a source address of the mail data and RECPT TO information that indicates information on a sending destination of the mail data. The mail data generation module 53 generates envelope information F1 in which a mail address of a mail generator is used as the MAIL FROM information and all mail addresses that are inputted into the TO destination input field d1, the CC destination input field d2 and the BCC destination input field d3 are used as the RECPT TO information.

The header information F2 includes Data information that indicates the date and time at which mail data is sent, From information that indicates the source address of the mail data, To information that indicates a TO destination, CC information that indicates CC destinations, Subject information that indicates a subject, Message-id information and the like. The Message-id information is an inherent identifier given to each mail data. The mail data generation module 53 generates Message-id information by combining, for example, mail data generation date and time, a process number, a domain name and the like.

The mail data generation module 53 generates header information F2 in which the destination inputted into the TO destination input field d1 is used as the To information, the destinations inputted into the CC destination input field d2 and the particular inputted into the subject input field d4 is used as the Subject information. The mail data generation module 53 does not cause the destinations inputted into the BCC information input field d3 to be included in the head information F2.

The communication control module 54 instructs the communication unit 11 to send the mail data M1 generated in the way described above to the mail server 2A. As this occurs, the control module 51 stores the BCC destinations included in the mail data M1 in the memory unit 14 while associating the BCC destinations with the mail data M1. FIG. 5 is a diagram showing an example of the BCC destinations that are stored in the memory unit 14. In the example shown in FIG. 5, the Message-id information is stored together with the BCC destinations as information that identifies the mail data M1.

The mail data M1 is sent to a mail client that is the sending destination shown in the envelope information F1 by way of the mail server 2A, the mail server 2B and the like. The mail data M1 is analyzed by a mail data analyzing module 55 of the mail client to which the mail data M1 is addressed. A display control module 56 then determines the contents of a display screen that is displayed on a display unit 12 based on the results of the analysis carried out by the mail data analyzing module 55.

FIG. 6 is a diagram showing an example of a mail data display screen D2 that is displayed on the display unit 12. A sender display field d11, a TO destination display field d12, a CC destination display field d13, a subject display field d14 and a mail message body display field d15 are provided on the mail data display screen D2. The display control module 56 instructs the display unit 12 to display the destination shown in the From information of the header information F2 in the sender display field d11, to display the destination shown in the To information in the TO destination display field d12, to display the destinations shown in the CC information in the CC destination display field d13, to display the particular shown in the Subject information in the subject display field d14 and to display the contents of the mail message body information F3 in the mail message body display field d15. A reply button d16 and a reply to all button d17 are provided on the mail data display screen D2.

When the accepting module 52 accepts the selection of the reply button d16 or the reply to all button d17, the display control module 56 instructs the display unit 12 to display thereon a reply mail data generation screen. The mail data generation module 53 generates reply mail data corresponding to pieces of information that are inputted on the reply mail data generation screen. FIG. 7 is a diagram showing an example of reply mail data M2 that is generated by the mail data generation module 53. in-reply-To information is included in header information F2 of the reply mail data M2. The in-reply-To information is information that identifies the mail data a reply source. In the example in FIG. 7, the identifier shown in the Message-id information of the mail data M1 of the reply source is included in the header information F2 of the reply mail data M2 as the in-reply-To information.

When the mail client 1 receives the reply mail data M2, the mail data M2 is analyzed by the mail data analyzing module 55. The display control module 56 determines the contents of a display screen that is displayed on the display unit 12 based on the results of the analysis carried out by the mail data analyzing module 55. FIG. 8A is a diagram showing an example of a mail data display screen D2 that is displayed on the display unit 12. In the mail data display screen D2, when the accepting module 52 accepts the selection of the reply to all button d17, the display control module 56 instructs the control unit 12 to display thereon the reply mail data generation screen. FIG. 8B is a diagram showing an example of a reply mail data generation screen D3 that is displayed on the display unit 12. On the reply mail data generation screen D3, the display control module 56 instructs the display unit 12 to input a TO destination included in the header information of the mail data M2 received in a TO destination input field d1 in advance and to input CC destinations included in the header information of the mail data M2 received in a CC destination input field d2 in advance.

In addition, the determination module 57 determines whether or not the mail data M2 received is reply mail data to the mail data including the BCC destinations that the communication unit 11 sent in the past. Specifically speaking, the determination module 57 compares the Message-id information stored in the memory unit 14 with the in-reply-To information included in the header information F2 of the mail data M2 received by the communication unit 11. Then, in the event that the Message-id information coincides with the in-reply-To information, the determination module 57 determines that the mail data M2 received is the reply mail to the mail data including the BCC destinations that the communication unit 11 sent in the past.

There may be a situation in which the mail data received includes no in-reply-To information. To deal with such a case, there may be adopted a configuration in which the control module 51 instructs the memory unit 14 to store in advance the mail message body that is included in the mail data together with the BCC destinations as information by which the mail data is identified. Then, the determination module 57 compares the main message body of the mail data received with the mail message body stored in the memory unit 14. In the event that the main message body stored in the memory unit 14 is included in the mail message body of the mail data received, the determination module 57 determines that the mail data received is the reply mail to the mail data including the BCC destinations that that the communication unit 11 sent in the past.

In the event that it is determined by the determination module 57 that the mail data M2 received is the reply mail to the mail data including the BCC destinations that the communication unit 11 sent in the past, the display control module 56 instructs the display unit 12 to input in advance the BCC destinations stored in the memory unit 14 in the BCC input field d3. In the example shown in FIGS. 5 and 7, the Message-id information that coincides with the in-reply-To information included in the header information F2 of the mail data M2 exists in the plurality of pieces of Message-id information stored in the memory unit 14. Because of this, as shown in FIG. 8B, the display control module 56 instructs the display unit 12 to input the BCC destination that is stored in the memory unit 14 in such a way as to be associated with the Message-id information that coincides with the Message-id information into the BCC destination input field d3.

The mail data generation module 53 generates reply mail data based on the information that is inputted complementarily into the input field on the mail data display screen D2 by the display control module 56 in the way described above and the information inputted based on the user operation through the operation unit 13. Namely, when the accepting module 52 accepts a reply command to reply to the mail data that is determined to be the reply mail to the mail data including the BCC destinations that the communication unit 11 sent in the past by the determination module 57, the mail data generation module 53 generates mail data that is addressed to sending destinations to which the BCC destinations stored in the memory unit 14 so as to be associated with the mail data of the reply source of the reply mail data are added in addition to sending destinations that the accepting module 52 accepts. Consequently, when replying to the reply mail data to the mail data that was sent in the past, the user does not have to input the BCC destinations used when the mail data was sent in the past, whereby the user can save the labor in inputting the BCC destinations.

Next, a flow of operations performed by the mail client 1 that is configured in the way described heretofore is described. FIG. 9 is a flowchart showing a flow of operations of sending mail data for reply that are performed by the mail client 1.

The communication control module 54 of the mail client 1 determines whether or not the communication unit 11 has received mail data from the mail server 2A (step S11). The communication control module 54 communicates with the mail server 2A via the communication unit 11 at a timing at which the accepting module 54 accepts a mail reception confirmation command or a timing at which a specified amount of time elapses to confirm whether or not the mail data has been delivered to the mail server 2A. If the mail data has been delivered to the mail server 2A, the communication control module 54 instructs the communication unit 11 to receive the mail data from the mail server 2A.

If the communication unit 11 receives the mail data (YES in step S11), the display control module 56 instructs the display unit 12 to display thereon the mail data display screen D2 (step s12).

Thereafter, the accepting module 52 determines whether or not it has accepted a reply command (step S13).

If the accepting module 52 has accepted a reply command (YES in step S13), the determination module 57 determines whether or not the mail data received is reply mail data to the mail data including the BCC destinations that was sent in the past (step S14).

If it is determined that the mail data received is the reply mail data to the mail data including the BCC destinations that was sent in the past (YES in step S14), the control display module 56 instructs the display unit 12 to display thereon the reply mail data generation screen D3 in which the BCC destinations are displayed complementarily (step S15).

In the other hand, if it is determined that the mail data received is not the reply mail data to the mail data including the BCC destinations that was sent in the past (NO in step S14), the display control module 56 instructs the display unit 12 to display thereon the reply mail data generation screen D3 without displaying complementarily the BCC destinations (step S16).

After the operation in step S15 or step S16 has been completed, the accepting module 52 determines whether or not it has accepted a send command (step S17).

If it is determined that the accepting module 52 has accepted a send command (YES in step S17), the mail data generation module 53 generates reply mail data corresponding to pieces of information that are inputted on the reply mail data generation screen D3 (step S18). Specifically, the mail data generation module 53 generates mail data that is addressed to the sending destinations to which the BCC destinations stored in the memory unit 14 so as to be associated with the mail data of the reply source of the reply mail data are added in addition to the sending destinations that the accepting module 52 accepts.

After the generation of the mail data, the communication control module 54 instructs the communication unit 11 to send the mail data generated to the mail server 2A (step S19).

The invention is not limited to the configuration of the embodiment but can be modified variously.

The mail data transmission program (the communication control program) that has been described in the embodiment may be such as to be recorded in a computer readable non-temporary storage medium such as, for example, a hard disk, a CD-ROM, a DVD-ROM and a semiconductor memory. As this occurs, the computer readable non-temporary storage medium on which the mail data transmission program is recoded constitutes the embodiment of the invention.

The invention claimed is:

1. A communication device comprising:
   a transmission unit that sends a-mail;
   a BCC destination memory unit that stores a BCC destination of a first mail sent by the transmission unit in the past, wherein the BCC destination is not included in header information of the first mail sent by the transmission unit in the past;
   a reception unit that receives a mail;
   a determination module that determines whether or not the mail received by the reception unit is a reply mail to the first mail including the BCC destination that was sent by the transmission unit in the past;
   an accepting module that accepts commands in relation to transmission or reception of a mail; and
   a mail data generation module that generates a second mail when the accepting module accepts a reply command to reply to, in mails that the reception unit has received, a mail that is determined to be the reply mail to the first mail including the BCC destination that the transmission unit sent in the past by the determination module, wherein
   the mail data generation module generates the second mail as being addressed to sending destinations, wherein the sending destinations include
   the BCC destination stored in the BCC destination memory unit, wherein the BCC destination is stored so as to identify that the BCC destination was a recipient of the first mail; and
   a sending destination that the accepting module accepts.

2. The communication device according to claim 1, wherein
   the BCC destination memory unit stores the BCC destination of the first mail that the transmission unit sent in the past together with identifier information that identifies the first mail that the transmission unit sent in the past, and wherein the determination module provides said determination of whether or not the mail received by the reception unit is the reply mail to the first mail including the BCC destination that the transmission unit sent in the past based on the identifier information stored in the BCC destination memory unit.

3. The communication device according to claim 2, wherein the BCC destination memory unit stores Message-id information that is given to the first mail including the BCC destination that the transmission unit sent in the past as the identifier information, and wherein the determination module determines that the mail that the reception unit receives is the reply mail to the first mail including the BCC destination that the transmission unit sent in the past in case the Message-id information stored in the BCC destination memory unit coincides with In-Reply-To information included in header information of the mail that the reception unit receives as a result of comparing the Message-id information with the In-Reply-To information.

4. The communication device according to claim 2, wherein the BCC destination memory unit stores a mail message body of the first mail including the BCC destination that the transmission unit sent in the past as the identifier information, and wherein the determination module determines that the mail that the reception unit receives is the reply mail to the first mail including the BCC destination that the transmission unit sent in the past in case, as a result of comparing a mail message body of a mail that the reception unit receives with the mail message body that is stored in the BCC destination memory unit, the mail message body of the mail that the reception unit receives includes the mail message body that is stored in the BCC destination memory unit.

5. The communication device according to claim 1, comprising further a display unit and a display control module that controls a display operation by the display unit, wherein when the accepting module accepts a reply command to reply to, in mails that the reception unit has received, the mail that is determined to be the reply mail to the first mail including the BCC destination that the transmission unit sent in the past by the determination module, the display control module instructs the display unit to display the BCC destination that is stored in the BCC destination memory unit in such a way as to be associated with a mail of a reply source of the reply mail in a BCC destination input field that accepts a BCC destination.

\* \* \* \* \*